United States Patent [19]

Gath et al.

[11] Patent Number: 4,788,870
[45] Date of Patent: Dec. 6, 1988

[54] SENSOR WITH A LATERAL RETAINING ARM

[75] Inventors: Dietmar Gath, Schoeffengrund; Holger Von Hayn, Frankfurt am Main, both of Fed. Rep. of Germany

[73] Assignee: Alfred Teves GmbH, Frankfurt am Main, Fed. Rep. of Germany

[21] Appl. No.: 57,421

[22] Filed: Jun. 2, 1987

[30] Foreign Application Priority Data

Jun. 2, 1986 [DE] Fed. Rep. of Germany ....... 3618528

[51] Int. Cl.$^4$ ............ G01P 13/00; G01B 21/16; G01B 7/14; G01D 21/00
[52] U.S. Cl. .................. 73/866.5; 324/208
[58] Field of Search .................. 73/866.5, 862.34; 324/208

[56] References Cited

U.S. PATENT DOCUMENTS

| 3,122,639 | 2/1964 | McCauley et al. | 73/862.34 X |
|---|---|---|---|
| 4,367,650 | 1/1983 | Hilgner et al. | 73/866.5 X |
| 4,495,810 | 1/1985 | Tessarzik et al. | 73/866.5 |
| 4,510,408 | 4/1985 | Jovick et al. | 310/168 |
| 4,519,243 | 5/1985 | Trautmann | 73/866.5 |
| 4,611,493 | 9/1986 | Muth | 73/866.5 X |
| 4,640,128 | 2/1987 | Lewis | 73/866.5 |

FOREIGN PATENT DOCUMENTS

| 183333 | 6/1986 | European Pat. Off. |
|---|---|---|
| 2539141 | 3/1977 | Fed. Rep. of Germany |
| 2625265 | 12/1977 | Fed. Rep. of Germany |
| 2715175 | 10/1978 | Fed. Rep. of Germany |
| 3000926 | 9/1980 | Fed. Rep. of Germany |
| 3017193 | 11/1981 | Fed. Rep. of Germany |
| 3327400 | 2/1985 | Fed. Rep. of Germany |

Primary Examiner—Tom Noland
Attorney, Agent, or Firm—James B. Raden

[57] ABSTRACT

Above the level of a toothed disc (26), a sensor is fastened to a base member (23) by means of a lateral retaining arm (24). The retaining arm contains a guide bore (13) which extends vertically to the fastening surface (12) of the base member (23) and which receives in a sliding fit a substantially circular-cylindrical carrier member (11) which is formed with a central bore (33) for receiving a fastening bolt (15) screwed into a threaded bore (22) of the base member (23). The carrier member (11) extends into the inside of the guide bore (13) and terminates in an upper annular end surface (10). A circlip (14) whose external diameter corresponds to the diameter of the guide bore (13) seats on the end surface. In the area of the circlip, the bolt (15) has a cone-like enlargement (16) which, when the fastening bolt (15) is tightened, will be seated on the circlip (14) and press it axially against the carrier member (11) and radially against the wall defining the guide bore (13).

8 Claims, 1 Drawing Sheet

U.S. Patent
Dec. 6, 1988
4,788,870
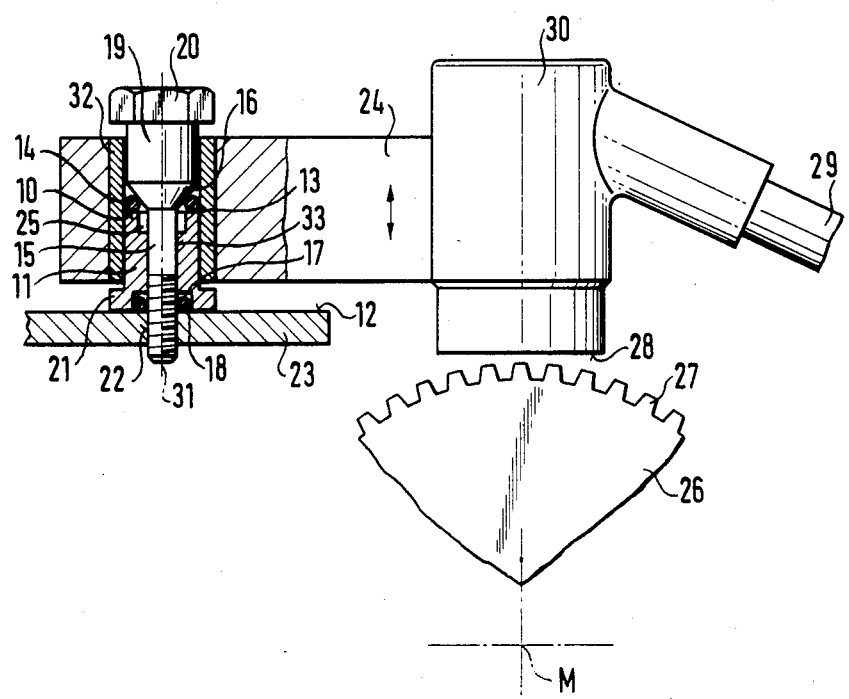

SENSOR WITH A LATERAL RETAINING ARM

BACKGROUND OF THE INVENTION

The present invention relates to a sensor which can be attached to a surface of a base member above an object which is definedly movable relative to the base member. The sensor has, at its front end, a measuring surface which is to be arranged at a defined small distance from the object for measuring its movement. The sensor comprises a lateral retaining arm which contains a through guide bore extending substantially vertically to the measuring surface and accommodates, with a sliding fit, a substantially circular-cylindrically designed carrier member. This carrier member contains a narrow central bore for receiving a fastening bolt which serves to fix the carrier member in position on the surface of the base member which extends substantially in parallel to the measuring surface. The sensor is adjustable in parallel to the axis of the carrier member and around this axis and can be secured in a set position in relation to the base member.

In such a known sensor, the lateral arm of the sensor can be clamped with the carrier member by means of an additional lateral clamping bolt, while the carrier member, in turn, is clampedly fixed on the base member by the head of the fastening bolt. Before the lateral bolt is tightened, the sensor can be adjusted in parallel to the axis of the carrier member and around this axis for giving the sensor an optimal alignment and an optimal distance with respect to the movable object. In a preferred embodiment, the movable object may consist of a toothed disc which acts magnetically on a coil arrangement ending in the area of the measuring surface. One or two pole pieces provided in the area of the measuring surface sense the passage of the tooth.

For securing this sensor, two bolts are provided and these must be tightened in two subsequent working steps.

SUMMARY OF THE INVENTION

It is an object of the present invention to provide a sensor of the type referred to which can be fastened to the base member by means of only one fastening bolt without impairing the possibilities of adjustment and the adjusting accuracy.

This object is achieved by the instant invention in that the carrier member extends from the fastening surface to a location inside the guide bore of the retaining arm. Abutting on the carrier member is a ring-type clamping arrangement whose external diameter corresponds to the internal diameter of the guide bore and which is radially expandable against the guide bore. The fastening bolt has a cone-like enlargement above the ring-type clamping arrangement which, when screwing the fastening bolt into its allocated bore in the base member, urges the ring-type clamping arrangement in a clamping fashion against the upper end surface of the carrier member and, thereby, spreads the ring-type clamping arrangement radially against the guide bore. As a consequence, the fastening bolts and the lateral arm are defined in position relative to one another.

Hence, the fastening bolt is used for the axial clamping of the carrier member on the base member and for simultaneously clamping between the carrier member and the lateral retaining arm. One single fastening bolt permits proper fastening of the sensor, without impairing the possibilities of adjustment.

In the simplest case, the ring-type clamping arrangement is a circlip which is put upon the annular surface of the carrier member. The diameter of the circlip is somewhat less than that of the guide bore, but the circlip is capable of being radially expanded to a considerable degree when the fastening bolt is tightened.

Another possibility of designing the ring-type clamping arrangement consists in the provision of a great number of balls or a great number of clamping segments which externally are conformed to the guide bore and upwardly are conformed to the cone-like enlargement.

To the end that the fastening bolt and the ring-type clamping arrangement are retained captive at the retaining arm prior to assembly, another embodiment provides for a further circlip to be seated clampingly on the fastening bolt in a recess on the lower end of the carrier member.

In addition, above the cone-like enlargement, the fastening bolt is formed with a cylindircal shank portion which is seated with a sliding fit within the guide bore.

Preferably, the dimensioning is such that the head of the fastening bolt is still above the guide bore at a distance therefrom when in its tightened condition.

Finally, it is suitable if the carrier member has a radially projecting flange at its bottom end. This flange forms a bottom stop surface for the material of the retaining arm encompassing the guide bore.

It is important that the distance between the head of the fastening bolt and the flange and, respectively, the fastening surface of the base member is appreciably larger than the length of the guide bore for ensuring axial displaceability of the retaining arm on the carrier member in axial direction, in order to meet adjusting requirements.

To safeguard proper retaining of the sensor, it is favorable to have the carrier member extend from the fastening surface up to between one-half and two-thirds of the length of the guide bore.

Finally, another embodiment provides that the carrier member, in its upper area radially inwardly of the abutment surface for the ring-type clamping arrangement, includes a preferably concentric and upwardly open recess enclosing the fastening bolt.

BRIEF DESCRIPTION OF THE DRAWING

The present invention will be described hereinbelow by way of example with reference to the accompanying drawing, the only FIGURE of which discloses a schematic cross-sectional view of an inventive sensor.

DETAILED DESCRIPTION OF A PREFERRED EMBODIMENT

As shown in the drawing, a toothed disc 26 rotates about its center M, with the teeth 27 provided at its outer periphery passing below the measuring surface 28 of a sensor in accordance with this invention. Non-illustrated pole pieces are provided at the measuring surface and the teeth 27 magnetically effect the pole pieces when passing by. The alternating signal (pulses) produced hereby is conveyed through a connecting line 29 to non-illustrated evaluating electronics, where the rotational speed of the toothed disc 26 is derived from the electric signal. The measuring surface 28 is formed on one end of a measuring head 30.

Branching laterally from the measuring head 30 is a retaining arm 24 which extends beyond a base member 23, whereat likewise the toothed disc 26 is rotatably arranged in a fashion not shown. The base member 23 contains a threaded bore 22 which extends perpendicularly, vertically as shown in the drawing, to the upper fastening surface 12. It can be seen that the fastening surface 12 extends substantially parallel to the measuring surface 28.

In the area above the threaded bore 22, the retaining arm 24 includes a central guide bore 13 whose axis is coaxial to the axis 31 of the threaded bore 22. In the embodiment illustrated, the guide bore 13 is provided with a clamping bushing 32 which is fixed to the retaining arm 24. The axial length of the clamping bushing 32 corresponds to the height of the guide bore 13 and, thus, the retaining arm 24.

A circular-cylindrical carrier member 11 extends in a slide fit from below the retaining arm 24 and into the guide bore 13. The carrier member 11 includes, on its bottom end, an annular flange 21 which projects radially beneath the clamping bushing 32, and which includes an annular recess 17 centrally formed in its bottom endface. A circlip 18 is arranged in recess 17 and is clampingly seated on the shank of a fastening bolt 15 inserted from above. The lower portion of the fastening bolt 15 is furnished with an external thread mating with the threaded bore 22 and extends through a central bore 33 of the carrier member 11. The carrier member 11 extends upwards into the guide bore 13 and terminates adjacent the upper half thereof. In its upper end area, the carrier member 11 is formed with a central annular recess 25 which is surrounded by an annular end surface 10. Abutting on the upper annular end surface 10 is a circlip 14 representing a ring-type clamping arrangement. The outer diameter of said circlip corresponds substantially to or just slightly less than the inner diameter of the guide bore 13.

In the screwed-in condition, the fastening bolt 15 is formed with a cone-shaped enlargement 16 above the upper annular end surface 10 of the carrier member 11. Formed above the enlargement 16 is a cylindrical shank portion 19 which is seated in slide fit within the guide bore 13. The normal hexagon head 20 of the fastening bolt 15 is disposed at an appreciable distance above the upper end of the guide bore 13.

The assembly of the inventive sensor is effected as follows.

Prior to assembly, the carrier member 11 is arranged with the fastening bolt 15 on the retaining arm 24, the lower circlip 18 prevents the fastening bolt 15 from dropping out of the central bore 33. This assembly is then placed onto the fastening surface 12 of the base member 23 by screwing the fastening bolt 15 into the threaded bore 22.

As soon as the fastening bolt 15 is screwed sufficiently deeply into the threaded bore 22, the cone-like enlargement 16 will abut from above on the circlip 14 and will spread or expand it radially against the guide bore 13 and urge it axially against the upper end surface 10 of the carrier member 11. To this end, a cone angle of approximately 45° is particularly suitable.

Prior to final tightening of the fastening bolt 15, when the clamping bushing 32 is still axially slidable and rotatable, the measuring head 30 is adjusted with respect to a tooth 27 of the toothed disc 26. At this point, the disc 26 is stationary. To effect this adjustment, the measuring head 30 can be moved both parallel to and around the axis 31.

As soon as the optimal adjustment has been attained, final tightening commences. The bolt 15 is again tightened by turning the hexagon head 20, while the circlip 14 abuts axially on the carrier member 11 and thereby fixes the carrier member in position on the fastening surface 12. Simultaneously, the circlip 14 abuts radially on the inner wall of the clamping bushing 32 and, thereby, constitutes a rigid connection between the circlip 14 and the retaining arm 24. Due to the clamping engagement between the enlargement 16 and the circlip 14, the fastening bolt 15 also forms a rigid component part of the sensor which is fixed in position on the base member 23 in a captive manner during operation. When desired, of course, the fastening bolt 15 can be detached by loosening it.

What is claimed is:

1. A sensor assembly including a measuring head having a measuring surface for sensing the movement of an object, a lateral retaining arm extending laterally from said measuring head, said lateral retaining arm having a guide bore extending substantially perpendicular to a plane containing said measuring surface, a carrier member slideably received in said guide bore and having a size so that said retaining arm can rotate about said carrier member, said carrier member being formed with a central bore, a fastening bolt received in said central bore for fixing said retaining arm and said measuring head on a base member having a surface extending in a plane substantially parallel to said measuring surface, said carrier member terminating in an end surface located inside said guide bore, an expandable ring-shaped clamping member located on said end surface of said carrier member, the external diameter of said clamping member being of a size so as to fit inside said guide bore, said fastening bolt being formed with a cone-like enlargement located adjacent the ring-shaped clamping member so that when said fastening bolt is tightened on the base member said cone-like enlargement urges said clamping member against the end surface of said carrier member and expands said clamping member radially outwardly against the guide bore.

2. A sensor assembly as claimed in claim 1 wherein the ring-type clamping member is a circlip.

3. A sensor assembly as claimed in claim 1 wherein a circlip is clampingly seated on the fastening bolt in a recess formed at the lower end of the carrier member.

4. A sensor assembly as claimed in claim 1 wherein said fastening bolt is formed with a cylindrical shank portion which is seated in slide fit within the guide bore.

5. A sensor assembly as claimed in claim 4 wherein the head of the fastening bolt is at a distance above the guide bore when said fastening bolt is in its tightened condition.

6. A sensor assembly as claimed in claim 1 wherein the carrier member is formed on its bottom end with a radially projecting flange.

7. A sensor assembly as claimed in claim 1 wherein said end surface of said carrier member is located between one-half and two-thirds of the length of the guide bore as measured from the end thereof adjacent the base member when said sensor assembly is assembled thereto.

8. A sensor assembly as claimed in claim 1 wherein said carrier member includes a recess in its upper area radially inwardly of the end surface.

* * * * *